United States Patent [19]

Akaishi et al.

[11] Patent Number: 4,777,760
[45] Date of Patent: Oct. 18, 1988

[54] ARTIFICIAL FLY

[76] Inventors: Takashi Akaishi, 3148, Hirosawa-Cho 2-Chome, Kiryu City, Gunma Pref; Kenji Osaki, 1966, Kashiwakura, Miyagi-Mura, Seta-Gun, Gunma Pref., both of Japan

[21] Appl. No.: 160,861

[22] Filed: Feb. 26, 1988

[30] Foreign Application Priority Data

Mar. 12, 1987 [JP] Japan .................................. 62-55269
Mar. 12, 1987 [JP] Japan .................................. 62-55270
Mar. 12, 1987 [JP] Japan .................................. 62-35212[U]

[51] Int. Cl.⁴ .................................................. A01K 85/08
[52] U.S. Cl. ........................................ 43/42.37; 43/4.5
[58] Field of Search .................... 43/4.5, 42.1, 42.25, 43/42.37

[56] References Cited

U.S. PATENT DOCUMENTS

| 1,102,089 | 6/1914 | Scholl | 43/42.37 |
| 1,212,752 | 1/1917 | Fiebig | 43/42.25 |
| 2,757,476 | 8/1956 | Pender | 43/42.25 |
| 2,814,148 | 11/1957 | Allen | 43/42.25 |
| 3,757,452 | 9/1973 | Parker | 43/4.5 |
| 3,815,276 | 6/1974 | Harrison | 43/43.1 |
| 4,158,927 | 6/1979 | Capra et al. | 43/4.5 |

Primary Examiner—M. Jordan
Attorney, Agent, or Firm—Young & Thompson

[57] ABSTRACT

An artificial fly has a worm body comprising a shank for forming a core, a lead wire wound around at the rear portion of shank, a cotton fiber or fabric wound around shank covering lead wire and secured by winding yarn around shank, a head portion provided at the front portion of shank, fly means selected from the group consisting of a feather, a skirt, lure body and a basket-worm hair and attached in the shoulder portion of shank; and a looped hook made of looped yarn and attached to the rear portion of shank.

10 Claims, 3 Drawing Sheets

FIG._5
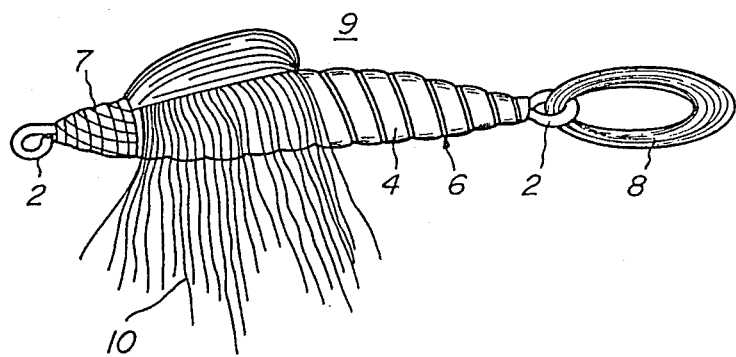
FIG._6
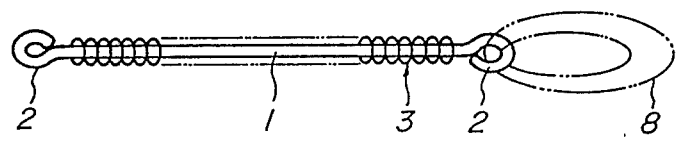
FIG._7
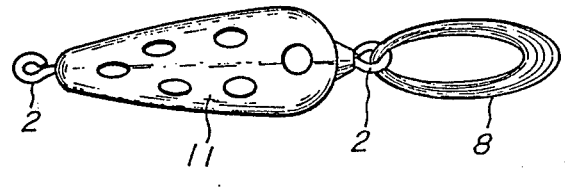

FIG_8
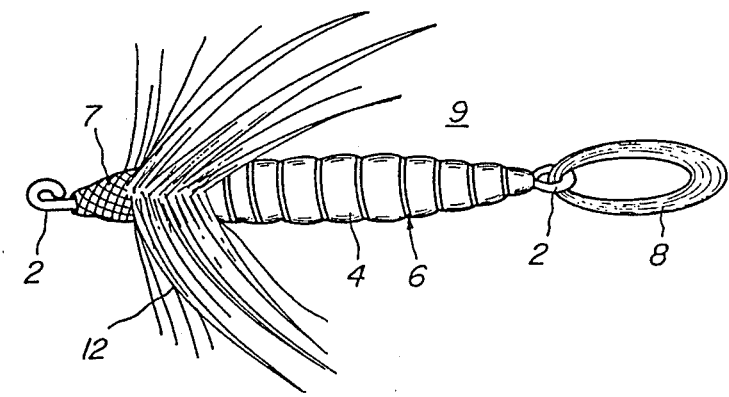
FIG_9
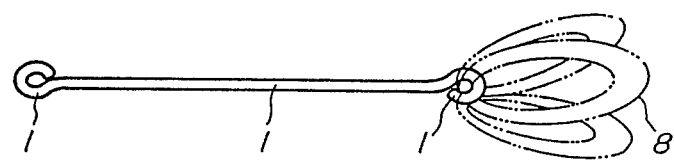
FIG_10
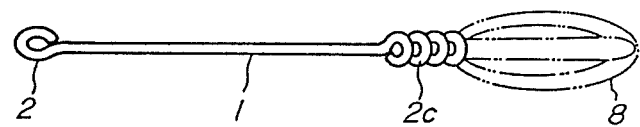

ARTIFICIAL FLY

BACKGROUND OF THE INVENTION

1. Field of the Invention

The present invention relates to an artificial fly particularly suitable for fly fishing in mountain torrent or stream.

2. Related Art Statement

The artificial flies are widely used through the world.

This kind of artificial flies is hitherto not a large-sized lure used for fishing in the sea or the lake, but a fly, a jig, lures or a plug for fly fishing at a mountain torrent or stream, and uses a hook for all dry flies, wet flies or particular nymph flies. Therefore, in case of fishing up a young fish or a fry, the fished young fish or fry is discharged into the water, but in such a case, every angler knows that the hook injures the interior of the mouth of the fish and that the discharged fish cannot relive.

As stated above, a metal hook has hitherto been used to such flies or jig. Therefore, even if a fished young fish or fry is discharged as described above, the hook has already been swallowed or hooked by fish teeth, so that the interior of the mouth is naturally injured when removing the hook, or the interior of the mouth has already been injured when the fish is caught, and if the hook is skillfully removed, the fish hardly relives. The most serious problem for solving this lies in a metal hook, and its solution is the main point of the present invention.

SUMMARY OF THE INVENTION

Therefore, an object of the invention is to obviate the abovementioned difficulty of the prior art by providing an improved artificial fly having a looped woolen hook or other synthetic fiber in a form of a loop at the end of shank instead of metallic hook.

The present invention relates to an artificial fly comprising a core made by winding nonskid yarn around a shank and further winding a suitable amount of a lead wire as a sinker thereon; an insect like body formed by covering a cotton fiber or other suitable synthetic fiber on said core; a skirt like hair or feather attached to a shoulder portion of said body; a head portion provided at the front of said body by winding yarn; and a looped woolen hook linked to an eye of rear portion of said shank, said looped woolen hook being made of woolen yarn or other suitable fiber in the form of a loop and linked to an eye of rear portion of said shank, and an eye provided to a front portion of said shank so as to connect to fishing line yarn.

An object of the present invention is to provide an artificial fly comprising: a worm body composed of a shank with an eye in the front end, a lead wire wound around the rear portion of said shank, a cotton fiber wound around said shank over the wounded lead wire, a thread wound around said cotton fiber, a head portion provided at the front portion of said shank, fly means selected from a feather, a skirt, lure body and a basketworm hair; and a looped hook attached to the rear end of said shank.

Another object of the present invention is to provide an artificial fly, wherein said looped hook is made of a material selected from the group consisting of a woolen yarn, a synthetic yarn in a form of a loop.

Further object of the present invention is to provide an artificial fly, wherein said shank have an eye formed in both of end.

Still further object of the present invention is to provide an artificial fly, wherein said looped hook is fixed to a ring so as to detachably connect an eye provided at the rear end of shank.

Another object of the present invention is to provide an artificial fly, wherein said worm body is a lure body.

Another object of the present invention is to provide an artificial fly, wherein said looped hook is made a plurality of looped hook attached through the rear eye of the shank.

Another object of the present invention is to provide an artificial fly, wherein said shank have an eye at the front and rear end of shank, the front eye being for connecting to fishing line yarn, and the rear eye being for detachably connecting a looped hook.

Another object of the present invention is to provide an artificial fly, wherein a lead wire is in a form of ribbon or plate like sinker.

Another object of the present invention is to provide an artificial fly, wherein said shank have an eye ring for connecting a fishing line yarn and a coiled portion at the rear end of shank for attaching a yarn looped hook.

Another object of the present invention is to provide an artificial fly, wherein said shank have an eye ring for connecting a fishing line yarn and a straight portion for fixing a yarn looped hook at the rear end portion of shank.

BRIEF DESCRIPTION OF THE DRAWINGS

For a better understanding of the invention, reference is made to the accompanying drawings, in which:

FIG. 5 is a front view of a complete artificial fly in another embodiment of the present invention;

FIG. 6 is an explanatory view showing the connection between a shank and a looped hook;

FIG. 7 is a front view showing an embodiment of a lure 11 in the present invention;

FIG. 8 is a front view of a complete artificial fly in another embodiment of the present invention; and FIGS. 9 and 10 are partial front views showing the connection between a shank and a woolen looped hook in the present invention.

Throughout different view of the drawings, 1 is a shank, 2 is an eye formed on the end of shank, 2a is a ring, 2b is a stem, 2c is a coiled portion, 3 is a lead wire for applying suitable weight for artificial fly as a sinker, 4 is a cotton fiber covered for making a worm body, 5 is a feather attached for worm body, 6 is a thread for forming worm body, 7 is a head portion, 8 is a woolen looped hook, 9 is a worm body, 10 is a skirt, 11 is a lure body, 12 is a basketworm hair.

DESCRIPTION OF THE PREFERRED EMBODIMENTS

Figure 1:
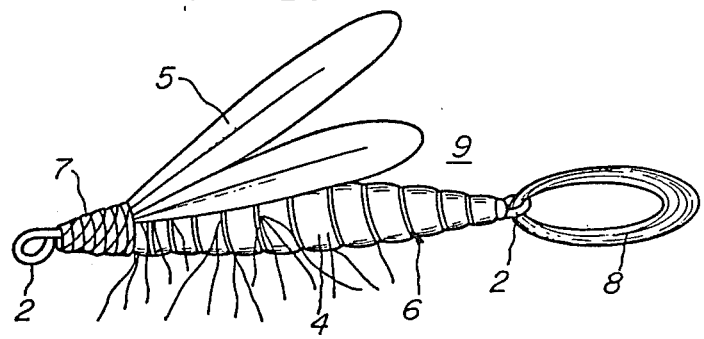
FIG. 1 is a front view of a complete artificial fly.
Figure 2:
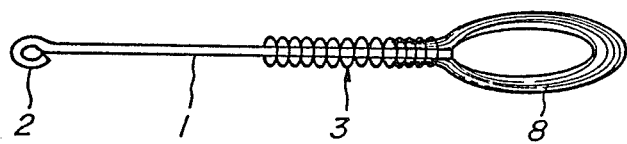
FIGS. 2 to 4 are each an explanatory view showing the connection between the shank and the woolen looped hook of the artificial fly.
Figure 3:
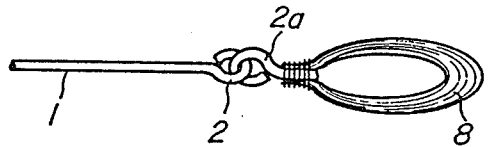

The artificial fly will now be described in detail by referring to embodiments which are applicable to the artificial fly. In referring FIG. 1 showing a front view of a complete artificial fly, an eye 2 is provided in the front end of shank 1 and a woolen looped hook 8 is fixed on the rear end of shank 1 by winding a lead wire 3 of suitable weight as a sinker thereon so as to provide an axial core, a cotton fiber 4 is wound onto said axial core and bound by winding yarn 6 thereon. A feather 5 is fixed to the shoulder portion together with a head portion 7 by winding yarn 6. Thus a worm body 9 is completed. The connection of said woolen looped hook 8 to the rear end of shank 1 may be used a ring 2a in which said woolen looped hook 8 is fixed, and the ring 2a is coupled to the eye 2 provided in the rear end of shank 1. In this case, the eyes 2, 2 is provided in both end of shank 1 as shown in FIG. 3.

Figure 4:
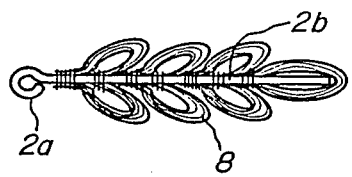

FIG. 4 shows another embodiment of woolen looped hook 8. In the case, an eye ring 2a is provided in one end of a stem 2b, and a woolen looped hook 8 is fixed to said stem 2b in a manner such that a multiple woolen looped hook 8 is provided on said stem 2b.

FIG. 5 shows another embodiment of a complete artificial fly in which two eyes 2, 2 are provided in both end of shank 1, a woolen looped hook 8 is fixed through eye 2 to form a looped hook, and a skirt 10 or a basketworm hair 12 is provided and fixed in the shoulder portion of the shank 1 together with the head portion 7 in the front portion of the shank 1 by winding yarn 6.

FIG. 6 shows a step of providing an artificial fly, in which two eyes 2, 2 are provided on both end of shank 1 and a woolen looped hook 8 is connected to the rear eye 2 of the shank 1 and a lead wire 3 is wound on said shank 1 to provided a suitable weight as a sinker, a cotton fiber 4 is wound around said shank 1 to make a worm body 9 and attached a skirt 10 and a head portion 7 as shown in FIG. 5.

FIG. 7 shows another embodiment of artificial fly, in which a lure body 11 is attached around a shank 1 and a woolen looped hook 8 is connected through a rear eye 2.

FIGS. 8 to 10 show another embodiment of an artificial fly. In this case, a basketworm hair 12 is attached in the shoulder portion of shank 1 together with a head portion in the front portion of shank 1, and the other construction is as same as in FIG. 5.

FIG. 9 illustrate a shank 1 having two eye rings provided on both side of shank 1 and a plurality of woolen looped hooks 8 are attached through eye ring 2.

FIG. 10 illustrates a coiled portion 2c provided in the rear end of shank 1, in which a woolen looped hook 8 is connected to said coiled portion 2c.

Throughout FIGS. 1 to 10, a looped hook 8 is made of woolen yarn, synthetic fiber or other suitable fiber and fixed in a form of loop to eye ring provided on rear end of shank 1 for catching fish teeth as a fly, lure, jig or plug instead metal hook used in the prior art.

The woolen looped hook 8 according to the invention is acting as artificial fly in a manner such as lure, jig or plug having a metallic hook, while the woolen looped hook 8 without a metallic fishhook serve quiet effectively to catch the fish tooth as hook but not injuring the fish tooth. So when a fisherman does fly fishing and a young fish or a fry is flied or fishing up, the fished young fish or fry can easily be discharged into water without injuring the fish teeth and mouth and let make the discharged fish to relive.

Therefore, the present invention can improve the prior fly, lure, jig or plug with metallic hook by using a woolen looped hook which have no metallic hook.

The hook according to the invention is a woolen looped hook provided on a worm body 9 so as to act as a lure jig or plug, aiming at fly fishing a fish such as trout, char, rainbow trout, dace and the like in a mountain torrent.

In artificial fly fishing, according to the invention, the fish teeth is hooked by a woolen looped hook, so that in case of discharging young fish or fry, the hook never injures fish teeth and has an effect of stocking a river with fish without hindrance.

In addition, even if the woolen looped hook is used as a lure, an effective fly fishing can be served.

A great industrial merit for river fishing can be expected by the artificial fly according to the present invention.

Although the invention has been described with a certain degree of particularity, it is understood that the present disclosure has been made only by way of example and that numerous changes in details of construction and the combination and arrangement of parts may be resorted to without departing from the scope of the invention as hereinafter claimed.

What is claimed is:

1. An artificial fly comprising:
a worm body composed of a shank with an eye in the front end, a lead wire wound around the rear portion of said shank, a cotton fiber or fabric wound around said shank over the wounded lead wire, a thread wound around said cotton fiber, a head portion provided at the front portion of said shank, fly means selected from a feather, a skirt, lure body and a basketworm hair; and a looped hook attached to the rear end of said shank.

2. An artificial fly as defined in claim 1, wherein said looped hook is made of a material selected from the group consisting of a woolen yarn, a synthetic yarn in a form of a loop.

3. An artificial fly as defined in claim 1, wherein said shank have an eye formed in the front and rear end of shank.

4. An artificial fly as defined in claim 1, wherein said looped hook is fixed to a ring so as to detachably connect to an eye provided at the rear end of shank.

5. An artificial fly as defined in claim 1, wherein said worm body is a lure body.

6. An artificial fly as defined in claim 1, wherein said looped hook is made a plurality of looped hook attached through the rear eye of the shank.

7. An artificial fly as defined in claim 1, wherein said shank have an eye at the front and rear end of shank, the front eye being for connecting to fishing line yarn, and the rear eye being connected by a ring for detachably connecting a looped hook.

8. An artificial fly as defined in claim 1, wherein a lead wire is in a form of ribbon or plate like sinker.

9. An artificial fly as defined in claim 1, wherein said shank have an eye ring for connecting a fishing line yarn in the front end of shank and a coiled portion at the rear end of shank for attaching a yarn looped hook.

10. An artificial fly as defined in claim 1, wherein said shank have an eye ring for connecting a fishing line yarn and a straight portion for fixing a yarn looped hook at the rear end portion of shank.

* * * * *